United States Patent [19]
von Hofen

[11] Patent Number: 4,524,865
[45] Date of Patent: Jun. 25, 1985

[54] UNIVERSAL PLATFORM CHAIN

[76] Inventor: Edward L. von Hofen, 5449 Willow, Vermilion, Ohio 44089

[21] Appl. No.: 318,934

[22] Filed: Nov. 6, 1981

[51] Int. Cl.³ .............................................. B65G 17/06
[52] U.S. Cl. ...................................................... 198/852
[58] Field of Search ........................... 198/850–853; 474/211, 241, 206, 232–236

[56] References Cited

U.S. PATENT DOCUMENTS

| | | | |
|---|---|---|---|
| 1,861,642 | 6/1932 | Paulson | 198/189 |
| 1,965,285 | 7/1934 | Gilstad | 198/852 X |
| 2,290,981 | 9/1939 | Maguire | 198/189 |
| 3,344,905 | 10/1967 | Von Hofen | 198/850 |
| 3,842,968 | 10/1974 | Owens | 198/851 |

FOREIGN PATENT DOCUMENTS 759666 2/1934 France ................ 198/850

Primary Examiner—Joseph E. Valenza
Assistant Examiner—Dennis Williamson
Attorney, Agent, or Firm—Gustalo Nunez

[57] ABSTRACT

A ball and socket conveyor chain, the links of which are designed so as to be capable of flexing in a plurality of planes and also designed to have upper table portions for supporting articles to be conveyed and which include a ball portion and a socket portion integrally made a part of the table portion. The ball portion of one link is retained in the socket portion of an adjacent link by a cap having outer surfaces that are drivingly engagable by some drive means. The method of connecting the links is unique in that the successive links comprising the chain are not connected to each other, but rather to every other link in the chain.

2 Claims, 8 Drawing Figures

U.S. Patent Jun. 25, 1985 Sheet 1 of 2 4,524,865
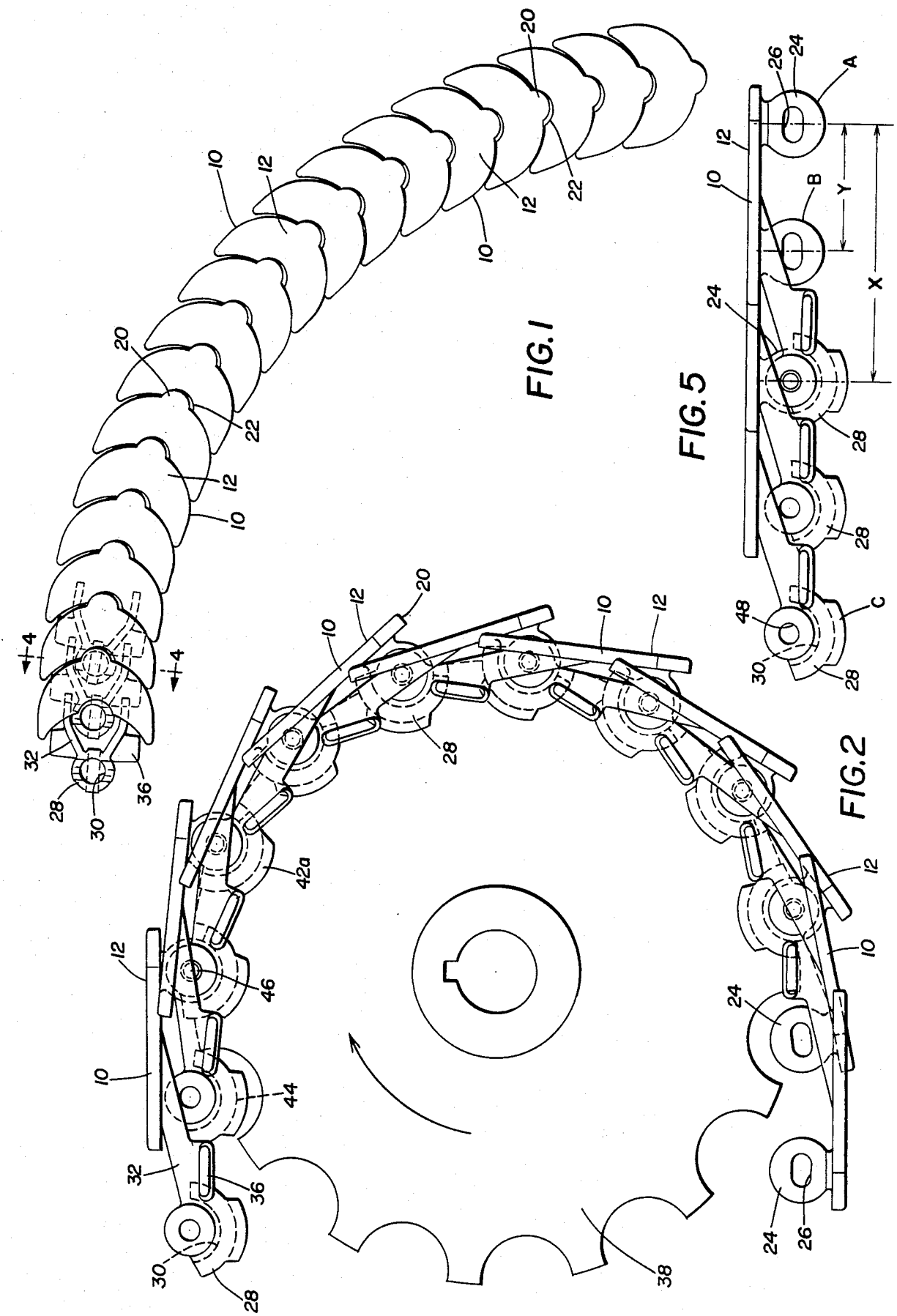

UNIVERSAL PLATFORM CHAIN

BACKGROUND OF THE INVENTION

1. Field of the Invention

This invention relates in general to chains and in particular, to chains of the conveyor type, being made up of links which are so designed as to be capable of flexing in a multitude of planes.

2. Description of the Prior Art

Various styles and designs have been devised for conveyor chains. The early chains were made of welded steel plates and were very cumbersome to operate and difficult to install and maintain. With the technological advances made through the years, a great many of the chains are made today from thermoplastic materials such as acetal and polycarbonate. Conveyor chains have a very important place in our industrial systems for moving product from one place to another.

An early example of such a chain is U.S. Pat. No. 1,861,642 granted to Paulson. This patent relates to a chain capable of moving in various planes and also having the feature of easy maintenance, a feature which is one of the novelties stressed in the present application. Paulson teaches a link member of complex mechanical structure, quite unlike that in the present application. Paulson also teaches a chain connected by a ball and socket, however, the manner in which this is accomplished in present day requirements would be economically prohibitive. The patent to Maguire, et al. U.S. Pat. No. 2,290,981 also teaches a conveyor belt system having a ball and socket type of connection between links. However, the remarks made for Paulson above, are true for the Maguire patent. Maguire teaches a conveyor belt system quite unlike that contemplated by the applicant.

U.S. Pat. No. 3,344,905, issued to Von Hofen, the applicant herein discloses a conveyor system quite unlike that taught by either Paulson or Maguire. U.S. Pat. No. 3,344,905 Pat. is also quite unlike the invention being presented herein. U.S. Pat. No. 3,344,905 teaches a conveyor system having a ball and socket connection. However, this system is also subject to the same criticisms that are levied contra Paulson and Maguire. The U.S. Pat. No. 3,344,905 system is mechanically complex, it requires a multitude of parts per link member and numerous screw type attaching means which are not found in the presence invention.

The prior art cited does not disclose a chain which can be assembled simply by straddling one link member on to another link member, nor does the cited art disclose a chain capable of being assembled without tools.

SUMMARY OF THE INVENTION

The chain contemplated herein is of the platform type which can be used to convey products such as bottles, cans, containers of all types from one point to another. The chain is capable of going in a straight line, around corners, up and down inclines. It is capable of easy maintenance in which individual link members may be deleted or added with no difficulty and no special tools being required. The chain is designed for ease in cleaning when required.

The individual links are all one piece members having thereon, a ball on one end, a hemispherical socket on the other and a work platform. Because of the design employed by the applicant, the link members are injection molded from plastic types of materials having the characteristics of low coeffient of friction, wear resistance and resistance to moisture absorbtions. The links also have very high breaking strength, resistance to impact and high thermal capacity. Of course all of the characteristics cited above may be modified, depending upon the application simply by making changes in the chemical composition of the plastic, metal or cast material being used.

Universal Platform Chain as the name implies is a chain that can flex in a horizontal radius as well as a vertical radius. Cresent Shaped Platforms are attached to the top of the chain and are used to transport bottles, cans or any other product in a straight plane or around corners or up an incline if so desired. The chain is driven by a sprocket which will engage the chain on the bottom surface.

The chain links are connected to each other by a ball which is inserted into a hemispherical socket. The ball is retained in the socket by a pin. The ball and socket construction enables the chain to flex right or left on horizontal plane or up or down on vertical plane. The method of connecting the links to this particular chain is unique in that the successive links comprising the chain are not connected to each other. Rather, the links are connected to every other link. This feature will be explained below with the aid of the drawings.

The Universal Chain also differs from other chains doing the same task in that the horizontal pivot point between every other link is twice the distance of platform pitch, for instance, if the pitch of the platform is $1\frac{1}{2}''$ then the pivot distance is $3''$. The increase of pivot distance is achieved by having the links connected to every other link. The rationale for increasing the horizontal pivot distance is that this increases the chord distance by two. By increasing the chord distance the outer gap between platforms is cut in half, when the chain is going around turns on horizontal plane. By cutting down the outer gap, more chain is in contact with product being conveyed which achieves smoother transport of product. This is especially important when the chain is used as a reservoir.

By incorporating a cresent design for the transport platform and cutting down on outer gap on platforms when turning on horizontal turns as much smoother transportation of product is achieved.

BRIEF DESCRIPTION OF DRAWING

Further objectives and advantags of the invention will be hereinafter referred to and/or be apparent from the following description of the preferred embodiment of the improved universal chain construction shown particularly in the accompanying drawings and as set forth the appended claims.

FIG. 1 is a partial top plan view of connected links and shown in dotted lines, the bottom of said links.

FIG. 2 is a partially broken away side elevation view of the chain wound on a driving sprocket.

FIG. 5 is a partial cross sectional side view of the chain.

DESCRIPTION OF THE PREFERRED EMBODIMENT

Figure 3:
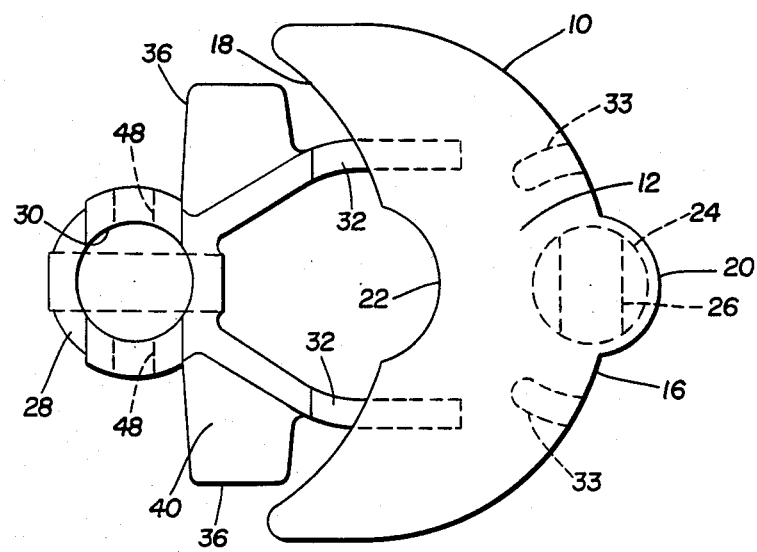
FIG. 3 is a top plan view of one link.
Figure 8:
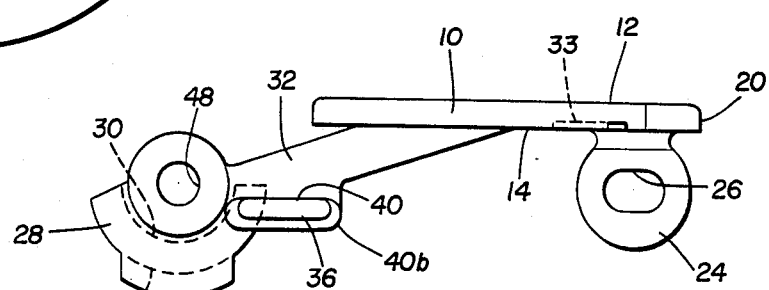
FIG. 8 is a side view of one link in the chain.

As shown in the drawings, a universal chain embodying the present invention comprises a plurality of individual links 10 each having an upper or load supporting surface 12 and a bottom surface 14 that extends laterally outward in a direction away from the longitudinal axis of the chain. The load surface 12 resembles a half moon, that is, it is convex on the outside end 16 and concave on the inside end 18. Located on the uppermost end of 16, is a hemispherical portion 20. Located on the inside end 18 is a cut out portion 22 which is mirror image of 20.

Figure 6:
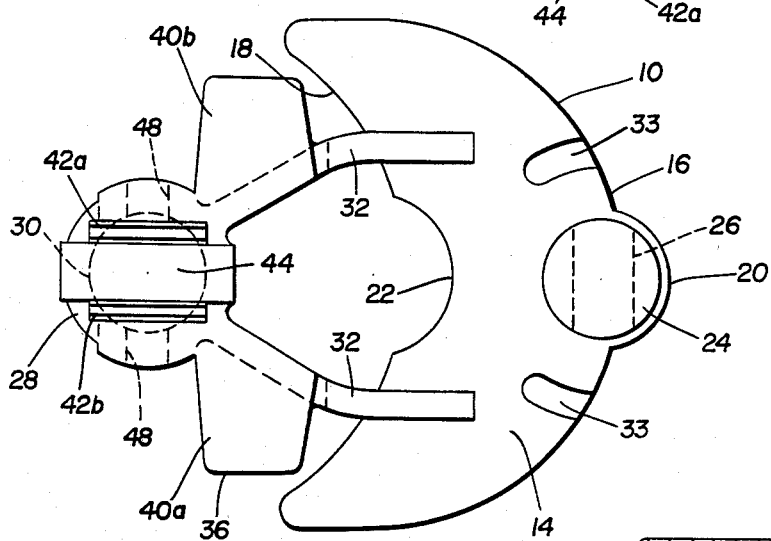
FIG. 6 is a bottom plan view of one link in the chain.
Figure 4:
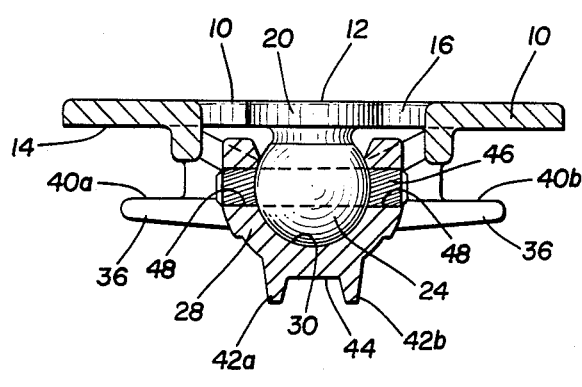
FIG. 4 is a cross sectional end view of one link in the chain illustrating the ball and socket connection.

Referring to FIGS. 5 and 6, there is a ball 24 integral to the bottom side of the hemispherical portion 20. The ball 24 has an opening 26 therethrough in which the longitudinal axis of the opening 26 is perpendicular to the longitudinal axis of the chain and in a plane parallel to the load surface 12.

A ball retaining or cap member 28 shaped to define an internal semi-spherical ball receiving cavity 30 of substantially the same dimensions as ball 24. The cap member 28 has a pair of openings 48 located therethrough. The longitudinal axis of the openings 48 is perpendicular to the longitudinal axis of the chain. Further, the longitudinal axis of the openings 48 is the same as that of ball opening 26 when a ball 24 is fitted into the cavity 30. Cap member 28 is integral to the surface 14 and to strengthen this relationship, a pair of rib members 32 is integral to the cap member 28 and surface 14. Also provided on surface 14 are a pair of ridges 33 upon which a portion of the rib members 32 set upon for additional stability.

Surface 14 is also provided with a pair of wings 36 extending transversely to the longitudinal axis of the chain.

The wings 36 are also affixed to the cap member 28 and rib members 32 and are adapted to be engaged in a guided relationship by some guide rod fixed between the top surface 40 of wings 36 and the bottom surface 14 of the work platform. Similarly, guiding forces may be placed in moving contact with the side edges of 40a and 40b of the wings 36 if so desired.

Figure 7:
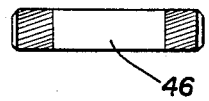
FIG. 7 is a plan view of a connecting link.

Located on the top of cap member 28 are a pair of projecting lugs 42a and 42b which are also used for guide means and propelling means such as a sprocket wheel 38. Lugs 42a and 42b and surface 44 define a definite area which may be engaged by the teeth of the sprocket wheel 38. FIG. 7 illustrates a pin member 46 which is used to connect a ball 24 and cap member 28 together in a manner which will soon be obvious.

As illustrated in the drawings, link 10 is integrally formed in one piece by a well known process such as injection molding. In this method of manufacture, the link 10 comes out of the mold with the ball 10, cresent shaped load and bottom surfaces 12 and 14, ball 24 and its recess 26 hollowed out cap member 28, rib members 32 and ridges 34. Also wings 36, lugs 42 and sprocket tooth engaging surface 44. The link comes out in one piece with all the parts integral to each other. The link member 10 may also be formed by conventional casting methods. The method of manufacture is determined by the type of material that the link member is to be formed out of. The assembly of the chain can best be understood by referring to FIGS. 1 and 5. Three link members are shown and labeled A, B, and C in FIG. 5. The cap members 28 associated with link A is connected to the ball member 24 of link C. The cap member 28 associated with link B would be connected to the ball member of a fourth link in the chain, if it were shown. It can thus be seen that the individual links are connected by straddling each other with another link interposed between the connected links, a novel type of connection which increases the efficiency of this chain.

The chordal distance as defined in this invention is measured from the pivot point of every other link. This distance is shown as X in FIG. 5. The pitch is defined as the distance between the ball members 24 of adjacent links and shown as Y in FIG. 5.

The chain is assembled by placing ball portion 24 into the cavity 30 of the semi-hemispherical cap member 28 of a subsequent link as described above, and securing ball 24 within said cavity 30 by inserting a pin 46 through the cap member openings 48 and the ball opening 26. No tools are needed for the assembly process. The pin 46 is knurled on each end for providing a better grip between the pin 46 and the surface material of openings 26 and 48. Of course, it is evident that other types of pins may be used, such as pressure fitting pins, or screw type means. However, it has been found that the knurled type pin provides the best fit and the easiest type of connection to make without tools and one that is not to difficult to break, again without any special tools in the event repair to the universal chain is necessary.

The operation of the conveyor chain contemplated here is such that the product to be transported is placed on the load surface 12. In order to provide movement, the sprocket 38 engages lugs 42 and propels them forward. The lugs 32 also act as guide and retaining means. When the chain is being moved in a horizontal plane, and on a horizontal curve, the lugs 42 will keep the change from swaying from side to side. Also, to insure a smooth straight forward movement, the conveyor system can be provided with sides, (not shown) having wall surfaces set apart in a parallel manner at a distance to allow the wing edges 40 pass therethrough. When moving through a curve, it can be seen that the wings 40 will prevent the links 10 from any type of movement. When going up or down inclines, the chain is prevented from leaving the sprocket wheel or from being raised up off of the supporting platform of the convey chain, by the inclusion of guide means attached to the wall surfaces of the conveyor system. These guide means are adapted to fit between the wings 30 and the bottom surface 14. It can be seen that these guide means will prevent the chain from experiencing up and down motions.

One embodiment found to be particularly successfull is one where the pivot point from one link to the next is three inches. This decreases the gap between successive loading surfaces 10 which results in a smoother ride for the universal chain.

The universal chain as described here is one where one link straddles every other next link. This type of assembly increases the chord length, or as mentioned previously, the pivot length in increased.

Having thus described by invention, what I claim is:

1. A conveyor system comprising a universal chain formed from a plurality of identical links each link being one completely integrated member and having:
   (a) a crescent shaped platform load bearing surface,
   (b) a ball member on a side opposite said platform load bearing surface at the front edge thereof, and
   (c) a hemi-spherical cap member having an inside diameter equal to the diameter of said ball member and adapted to receive said ball member, wherein said ball member of one link member is connected to the cap member of a third successive link member, said connection being a pivot point, and wherein the distance from a pivot point to a successive pivot point is twice the width of said platform load bearing surface.

2. A chain according to claim 1 wherein the individual link members are connected to every other link member with another link member interposed between said connected link members.

* * * * *